United States Patent [19]

Matsuura et al.

[11] Patent Number: 4,705,263

[45] Date of Patent: Nov. 10, 1987

[54] FLUID-FILLED BUSHING

[75] Inventors: Kazuo Matsuura; Hiroshi Yoshioka; Kiyoshi Koga, all of Tochigi, Japan

[73] Assignee: Honda Giken Kogyo Kabushiki Kaisha, Tokyo, Japan

[21] Appl. No.: 850,329

[22] Filed: Apr. 11, 1986

[30] Foreign Application Priority Data

Apr. 12, 1985 [JP] Japan .............................. 60-54687[U]

[51] Int. Cl.$^4$ ............................................. B23P 11/00
[52] U.S. Cl. ................................ 267/33; 29/149.5 A; 29/436; 267/121
[58] Field of Search .................... 29/149.5 A, 436; 267/33, 121

[56] References Cited

U.S. PATENT DOCUMENTS 4,464,822  8/1984  Pfeifer ................................. 29/436

FOREIGN PATENT DOCUMENTS 116649  7/1984  Japan .

Primary Examiner—Timothy V. Eley
Attorney, Agent, or Firm—Armstrong, Nikaido, Marmelstein & Kubovcik

[57] ABSTRACT

A fluid-filled bushing comprises at least two sleeves disposed in concentric relation to each other, a resilient member interposed between the two sleeves and having a substantially annular recess defined in an outer circumferential surface thereof, a partition disposed in the annular recess and having holes defined therein and defining first and second substantially annular fluid chambers in the annular recess which selectively communicate with each other through the holes of the partition, a fluid filled in each of the first and second fluid chambers, and a valve for variably restricting the flow of the fluid between the first and second fluid chambers.

3 Claims, 5 Drawing Figures 4,705,263

FLUID-FILLED BUSHING

BACKGROUND OF THE INVENTION

The present invention relates to a resilient bushing for use between a suspension link and a motor vehicle frame or between a suspension link and an axle, and more particularly to a fluid-filled bushing with variable compliance.

When a motor vehicle such as an automobile runs over a bumpy road, noise will be produced and vibration will be transmitted to the passenger compartment if the suspension mechanisms fail to dampen shocks sufficiently which are imposed on the automobile in the longitudinal or fore-and-aft direction thereof. One conventional means for increasing the flexibility of a suspension mechanism in the fore-and-aft direction of the automobile comprises a resilient bushing disposed between a suspension link and an automobile frame or between a suspension link and an axle. The suspension mechanism compliance should be adjusted in view of conditions in which the automobile runs since the attitude or posture of the automobile varies when it is braked, makes a turn, or travels over a rough road. Specifically, it is preferable for the bushing to have a greater degree of rigidity for higher automobile maneuvering stability, increased ability to travel along a straight line at higher speed, or reduced vibration at the start of the automobile. Conversely, the bushing should preferably be of lower rigidity for greater riding comfort and quietness in the passenger compartment.

Japanese Laid-Open Utility Model Publication No. 59(1984)-116649 discloses a typical resilient bushing with adjustable flexibility in the fore-and-aft direction of a motor vehicle. The disclosed resilient bushing comprises inner and outer sleeves disposed concentrically in a frustoconical casing integrally formed with a motor vehicle frame, an intermediate sleeve disposed concentrically between the inner and outer sleeves, and annular resilient bodies interposed between these sleeves. The bushing has first and second fluid chambers defined between the outer and intermediate sleeves in diametrically confronting relation, the first and second chambers being filled with an incompressible fluid such as an antifreeze. The first and second chambers are held in communication with each other through holes defined in the outer sleeve and an annular passage defined between the casing and the outer sleeve. A solenoid-operated spool valve is mounted on an outer peripheral surface of the casing for opening and closing the holes to bring the first and second chamber into and out of communication with each other, thereby adjusting the flexibility or "compliance" of the bushing in the fore-and-aft direction of the motor vehicle. However, the above conventional resilient bushing fails to sufficiently meet various different running conditions of the automobile since the compliance can be adjusted only in two steps by bringing the first and second chambers into and out of mutual communication.

SUMMARY OF THE INVENTION

Accordingly, it an object of the present invention to provide a fluid-filled bushing having fluid chambers communicating with each other through a passage with its cross-sectional area variable at multiple steps by turning a valve, so that the compliance of the bushing can be changed according to various running conditions of an automobile incorporating the fluid-filled bushing.

Another object of the present invention is to provide a fluid-filled bushing of a compact structure with a compliance varying mechanism accommodated in the bushing.

According to the present invention, a fluid-filled bushing comprises at least two sleeves disposed in concentric relation to each other, a resilient member interposed between the two sleeves and having a substantially annular recess defined in an outer circumferential surface thereof, a partition disposed in the annular recess and having holes defined therein and defining first and second substantially annular fluid chambers in the annular recess which selectively communicate with each other through the holes of the partition, a fluid filled in each of the first and second fluid chambers, and valve means for variably restricting the flow of the fluid between the first and second fluid chambers.

The above and further objects, details and advantages of the present invention will become apparent from the following detailed description of preferred embodiments thereof, when taken in conjunction with the accompanying drawings.

DESCRIPTION OF THE PREFERRED EMBODIMENTS

Figure 1:
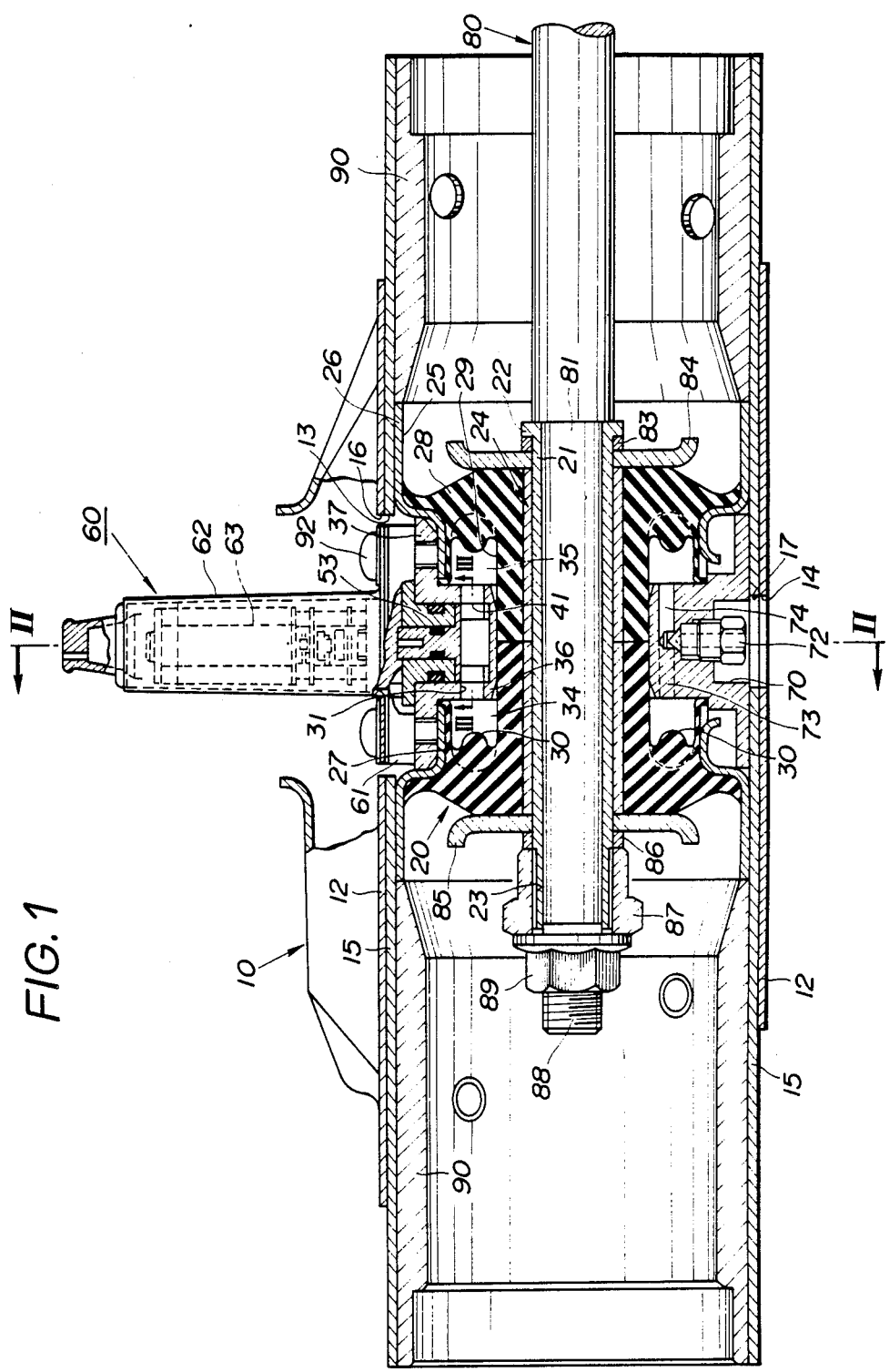
FIG. 1 is a cross-sectional view of a fluid-filled bushing according to the present invention.

As shown in FIG. 1, an outer tube 12 is fixed to a motor vehicle frame generally designated at 10. The outer tube 12 has a larger opening 13 defined substantially centrally in an upper outer circumferential surface and two circumferentially spaced smaller openings 14 (FIG. 2) defined in substantially diametrically opposite relation to the larger opening 13. An elongate inner tube 15 extends through the outer tube 12 and has a larger opening 16 and two circumferentially spaced smaller openings 17 registering with the larger opening 13 and the smaller openings 14, respectively.

Figure 2:
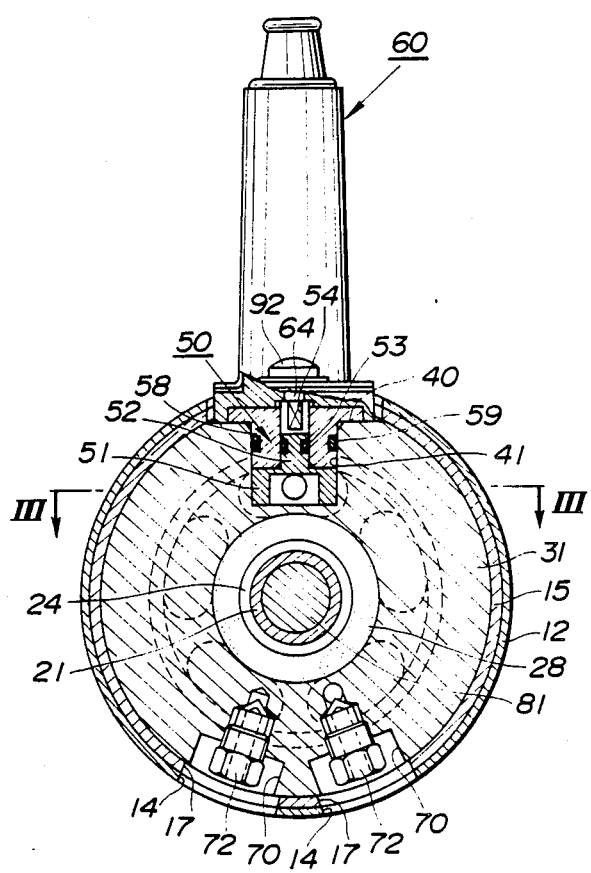
FIG. 2 is a cross-sectional view taken along line II—II of FIG. 1.

As illustrated in FIGS. 1 and 2, a bushing 20 according to the present invention comprises a first sleeve 21 having a flange 22 on one end thereof and a threaded surface 23 on the opposite end, a second sleeve 24 fitted over the first sleeve 21, and a third sleeve 25 disposed around and spaced coaxially from the first and second sleeves 21, 24, the third sleeve 25 having a larger tubular portion 26 and a smaller tubular portion 27. As shown in FIG. 1, the first sleeve 21 is of a unitary structure, and each of the second and third sleeves 24, 25 comprises two halves separated substantially at the center of the sleeve in the axial direction. The bushing 20 also includes an annular resilient member 28 disposed between the second and third sleeves 24, 25 and cured to the outer circumferential surface of the second sleeve 24 and the inner circumferential surfaces of the smaller tubular portion 27 and a portion of the larger tubular portion 26 of the third sleeve 25. The resilient member 28 has a substantially annular recess 29 defined centrally in the outer circumferential surface thereof and stops 30 projecting from inner peripheral surfaces defining the annular recess 29. The resilient member 28 serves to limit excessive movement of a suspension link (described later) in the axial direction. In the annular recess 29, there is disposed a substantially annular partition 31 defining substantially annular first and second fluid chambers 34, 35 in the annular recess 29 which are arranged in the axial direction of the bushing 20. The first and second fluid chambers 34, 35 are filled with working oil. The partition 31 has a ring 36 of a large thickness disposed in the annular recess 29 and fitted over the resilient member 28, and a substantially annular flange 37 integrally formed with the outer circumferential surface of the ring 36. The flange 37 has an upper inner circumferential surface fitted against the upper outer circumferential surface of the smaller tubular portion 27 of the third sleeve 25, and a lower outer circumferential surface fitted against the inner circumferential surface of the inner tube 15. The partition 31 has a flat surface 40 on its top and a first cylindrical recess 41 extending radially inwardly from the flat surface 40 to a position near the inner circumferential surface of the ring 36. The partition 31 also has two holes 43 (FIG. 3) defined axially of the bushing 20 and providing communication between the first and second chambers 34, 35.

Figure 3:
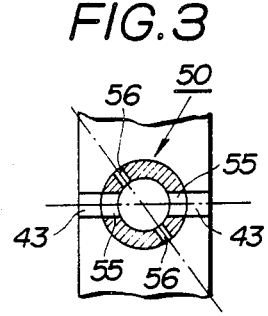
FIG. 3 is a cross-sectional view taken along line III—III of FIG. 1.

A valve generally designated at 50 is rotatably fitted in a first recess 41. The valve 50 comprises a larger-diameter disk 51 held against the bottom of the first recess 41 and a smaller-diameter rod 52 extending upwardly from the larger-diameter disk 51. A seal ring 53 is fitted around the smaller-diameter rod 52 which has a shaft hole 54 defined therein and receiving a driver shaft (described later on). As shown in FIG. 3, the larger-diameter disk 51 has a pair of first diametrically opposite valve ports 55 having the same diameter as that of the holes 43 and a pair of second diametrically opposite valve ports 56 smaller in diameter than the first valve ports 55, the second valve ports 56 being 60° spaced clockwise from the adjacent first valve ports 55. These first and second valve ports 55, 56 can be brought into selective communication with the holes 43 in the partition 31. A retainer 58 is interposed between the smaller-diameter rod 52 of the valve 50 and the inner circumferential surface of the first recess 41, with a seal ring 59 fitted around the retainer 58.

A driver/controller generally designated at 60 in FIG. 1 has a base 61 fastened to the flange 37, a casing 62 extending vertically upwardly from the base 61, and a driver mechanism 63 accommodated in the casing 62. The driver mechanism 63 comprises an actuator (not shown), a valve shifting means (not shown) for turning the valve 50 about its own axis in three steps in increments of 120°, and a driver shaft 64 (FIG. 2) fixedly fitted in the shaft hole 54 for turning the valve 50.

The partition 31 has two circumferentially spaced second recesses 70 defined in the bottom thereof in substantially diametrical opposite relation to the first recess 41. Drain cocks 72 are threadedly mounted respectively in the second recesses 70. The partition 31 also has in its lower portion two passages 73, 74 through which the first and second fluid chambers 34, 35 communicate with the exterior of the bushing 20 via the second recesses 70, respectively. When filling working oil in the first and second fluid chambers 34, 35, the drain cocks 72 are removed from the second recesses 70 to allow air to be forced out of the first and second fluid chambers 34, 35.

A suspension link generally denoted at 80 has a smaller-diameter end portion 81. For coupling the suspension link 80 to the motor vehicle frame 10 through the intermediary of the bushing 20, a spacer 83 and a disk-shaped plate 84 are first fitted over the first sleeve 21 and held against the flange 22 thereof, and then the bushing assembly, i.e., the second sleeve 24, the third sleeve 25, the resilient member 28, and the partition 31, are fitted over the first sleeve 21. Thereafter, a disk-shaped plate 85 and a spacer 86 are also fitted over the first sleeve 21 and held against the second sleeve 24 and the resilient member 28, followed by threading a nut 87 over the externally threaded surface 23 of the first sleeve 21. The smaller-diameter end portion 81 of the suspension link 80 is inserted through the first sleeve 21, and a nut 89 is threaded over an externally threaded surface 88 of the smaller-diameter end portion 81, thereby fastening the suspension link 80 to the bushing 20. Thereafter, the suspension link 80 and the bushing 20 are inserted into the inner tube 15 until the flat surface 40 of the partition 31 is positioned in the larger opening 13 of the inner tube 15 and the second recesses 70 are brought into registration with the smaller openings 17, respectively. Then, fixing collars 90 are held endwise against the opposite ends of the third sleeve 25 and fastened by bolts to the inner tube 15. The driver/controller 60 is fixed to the bushing 20 by placing the base 61 on the flange 37 of the partition 31 and then fastening the base 61 to the flange 37 by bolts 92.

Figure 4:
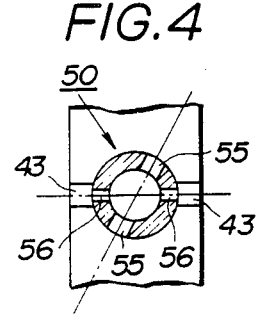
FIG. 4 is a cross-sectional view showing a valve turned 120° clockwise from the position of FIG. 3.

Operation of the bushing 20 is as follows: The driver mechanism 63 is driven to enable the driver shaft 64 to turn the valve 50 until the first valve ports 55 are brought into registration with the holes 43, respectively, of the partition 31. Since the holes 43 and the first valve ports 55 are of the same diameter, the first and second fluid chambers 34, 35 are in full communication with each other without any restriction on the flow of the working oil between the first and second fluid chambers 34, 35. Therefore, the bushing 20 has a larger degree of compliance. This selected valve position is suitable when the motor vehicle runs over bumpy roads. By turning the valve 50 by 120° clockwise from the position of FIG. 3 to the position of FIG. 4, the second valve ports 56 are brought into registration with the holes 43, respectively. Inasmuch as the second valve ports 56 are smaller in diameter than the holes 43, the flow of the working oil between the first and second fluid chambers 34, 35 is restricted by the second valve ports 56. The compliance of the bushing 20 is now reduced. When the valve 50 is further turned 120° clockwise from the position of FIG. 4, the communication between the holes 43 is shut off by the valve 50, bringing the first and second fluid chambers 34, 35 out of mutual communication. As a consequence, the flow of the working oil is completely cut off thereby to minimize the compliance of the bushing 20.

Figure 5:
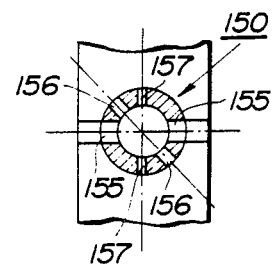
FIG. 5 is a view similar to FIG. 3, showing a modification of the valve of FIG. 3.

FIG. 5 illustrates a modified valve 150 having a pair of first diametrically opposite valve ports 155 having the same diameter as that of the holes of the partition, a pair of second diametrically opposite valve ports 156 spaced 45° clockwise from the first valve ports 155 and smaller in diameter than the first valve ports 155, and a pair of third diametrically opposite valve ports 157 spaced 45° clockwise from the second valve ports 156 and smaller in diameter than the second valve ports 155, the first valve ports 155 being spaced 90° clockwise from the third valve ports 157. The valve 150 can provide the bushing with three different degress of compliance by selectively bringing the first, second, and third valve ports 155, 156, 157 into registration with the partition holes, and can further minimize the bushing compliance by shutting off the communication between the partition holes.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A fluid-filled bushing comprising:
   at least two sleeves disposed in concentric relation to each other;
   a resilient member interposed between said two sleeves and having a substantially annular recess defined in an outer circumferential surface thereof;
   a partition disposed in said annular recess and having holes defined therein and defining first and second substantially annular fluid chambers in said annular recess which selectively communicate with each other through said holes of the partition;
   a fluid filled in each of said first and second fluid chambers; and
   valve means for variably restricting the flow of said fluid between said first and second fluid chambers.

2. A fluid-filled bushing according to claim 1, wherein said partition has a cylindrical recess defined therein, said valve means comprising a valve element movably disposed in said cylindrical recess.

3. A fluid-filled bushing according to claim 2, wherein said valve element has at least two valve ports of different diameters capable of selective registration with said holes of the partition.

* * * * *